March 26, 1929.  E. E. WEMP  1,707,034
CLUTCH
Filed Dec. 4, 1924   3 Sheets-Sheet 3
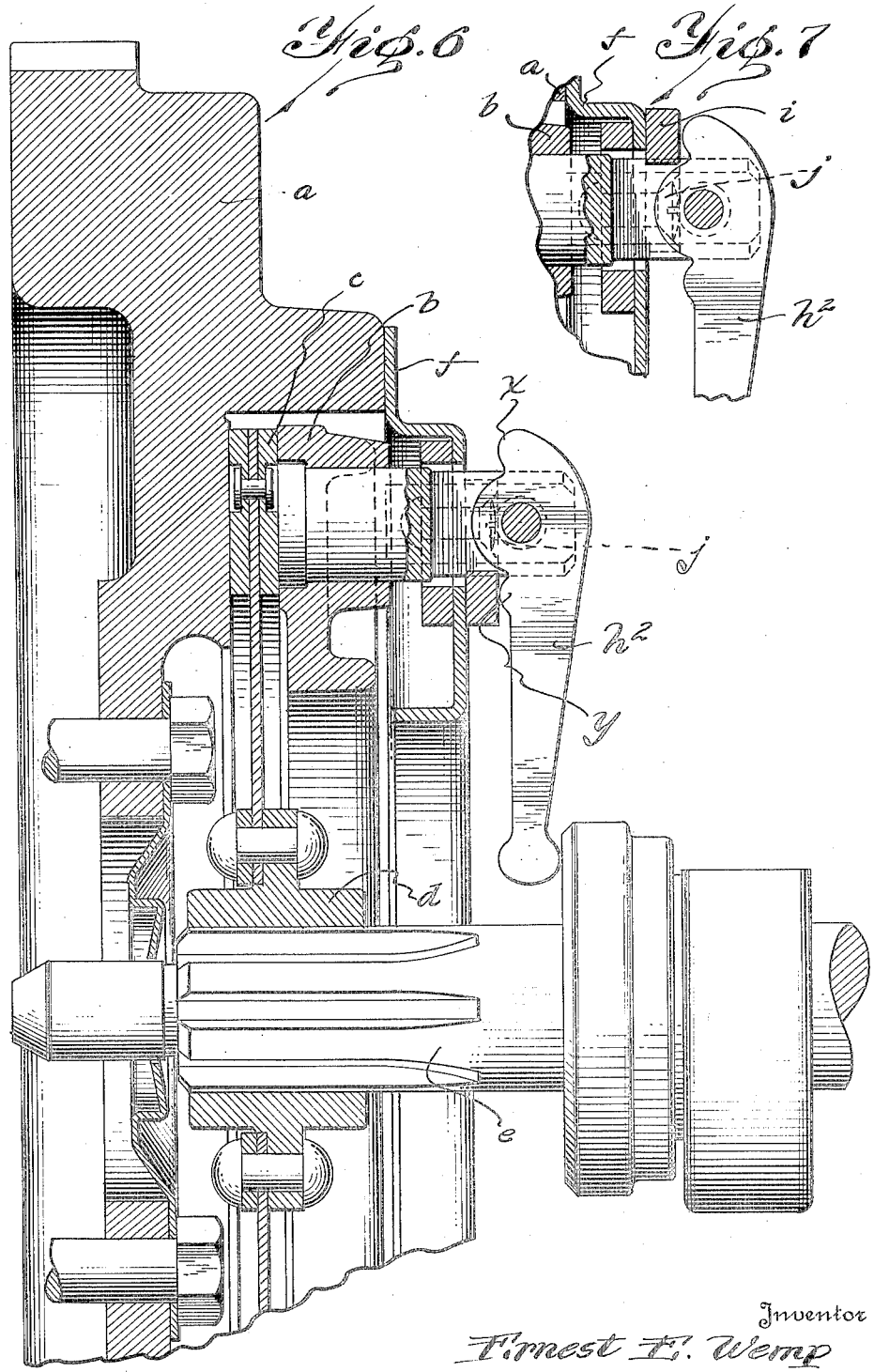

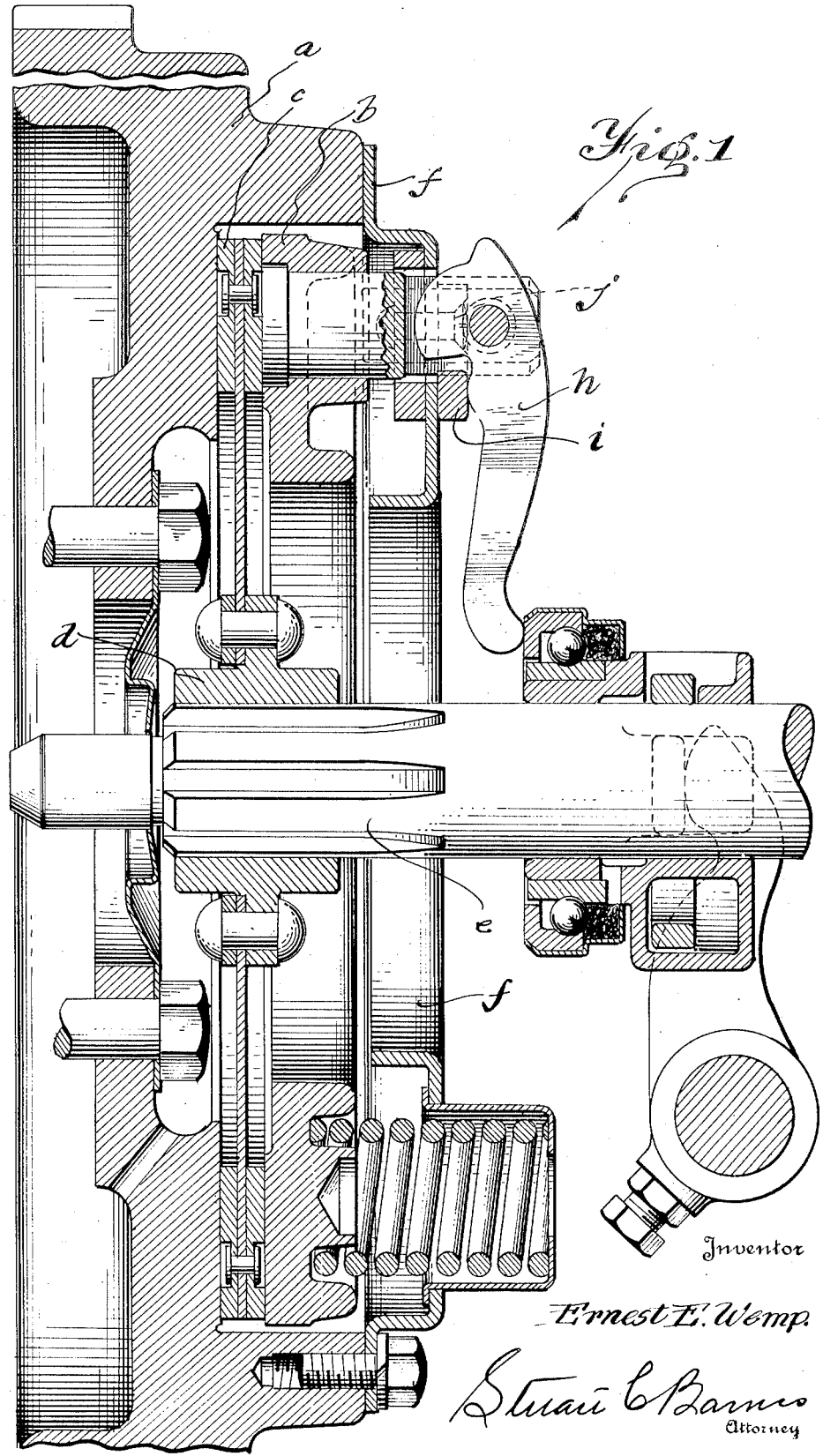

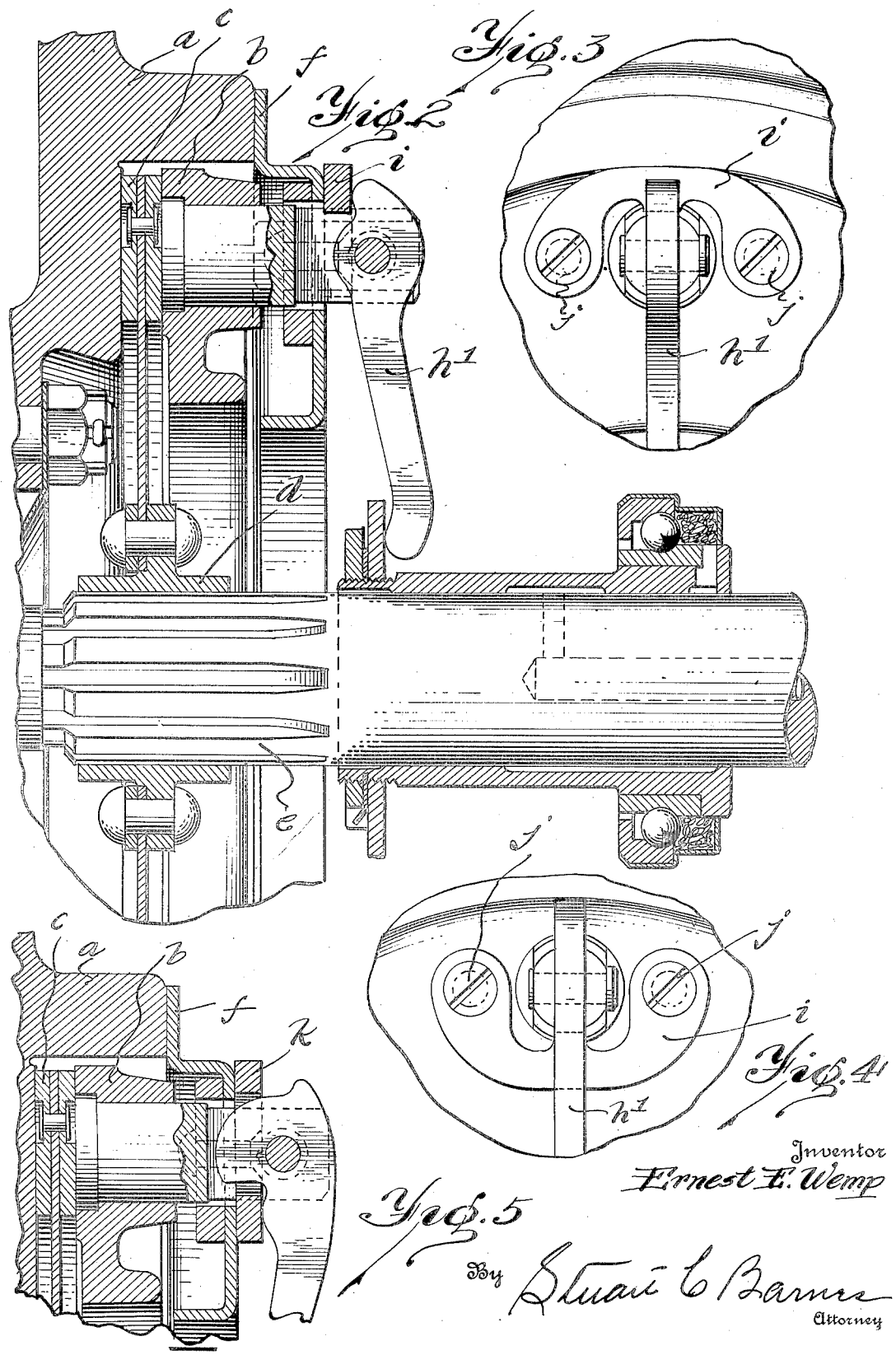

Patented Mar. 26, 1929.

1,707,034

UNITED STATES PATENT OFFICE.

ERNEST E. WEMP, OF DETROIT, MICHIGAN.

CLUTCH.

Application filed December 4, 1924. Serial No. 753,778.

This invention relates to clutches and has for its object a clutch construction which can be changed from a push release clutch to a pull release clutch by simply substituting a different form of lever or by substituting a different lever and changing the position of the fulcrum blocks, or in one modification by simply changing the block.

It is customary in present clutch manufacture to have two different designs of clutches for cars requiring a push release and cars requiring a pull release. This involves a large additional cost of manufacture due to two sets of dies, patterns, blue prints, etc., to say nothing of a large amount of extra investments in clutch parts and inventories required in duplicating each design of clutch for push release and pull release.

It is the object of the present invention to largely eliminate this difficulty by confining the substitute parts to a minimum.

In the drawings:

Fig. 1 is a section through the clutch, showing the push release design.

Fig. 2 is a section through the clutch, showing the pull release design.

Fig. 3 is a detail showing the lever and fulcrum in the pull release type.

Fig. 4 is a detail showing the lever and fulcrum in the push release type.

Fig. 5 is a sectional detail showing a slightly modified form which does not require the shifting of the fulcrum block.

Figs. 6 and 7 show a modification in which only the position of the fulcrum block requires change.

$a$ designates the fly wheel, which is one of the driving members; $b$ the thrust ring, which is the other driving member; $c$ designates the driven member carried on a hub $d$ splined on the end of the driven shaft $e$. A cover plate $f$ is bolted to the fly wheel and on this is arranged to fulcrum the clutch releasing levers $h$ and $h'$. Note that lever designated $h$ is a lever of the first order while the lever designated $h'$ is a lever of the second order. This in substance constitutes the only difference between my push release clutch and pull release clutch, the levers $h$ of the first order being utilized with the push release and the levers $h'$ of the second order being utilized with the pull release. This is made possible by the special design of the parts.

By utilizing a clutch in which the release is effected by levers working on separate fulcrum blocks on the back of the cover plate, it is possible to make the clutches push and pull release simply by altering the position of the fulcrum and the design of the levers, without in any way altering the design of the cover plate, or the other parts. To this end I provide a fulcrum block $i$, which is bolted to the cover plate by the bolts $j$. Where the lever $h$ of the first order is used, this fulcrum plate or yoke is turned with the opening facing towards the periphery of the cover plate; where the lever of the second order, $h'$, is used, this fulcrum block has its opening facing towards the center of the cover plate, as clearly indicated in Figs. 2 and 3. However, in place of using the fulcrum block of U-shape, it is possible to use a complete ring as is shown in Fig. 5, where the fulcrum plate is designated $k$. Here it is not even necessary to reverse the fulcrum plate but only to change the releasing levers. It will be seen that in the design shown in Figs. 2 and 3, where the lever $h'$ is of the second order, the fulcrum plate is on the outside of the cover plate, the load in the center, and the point of application of the power at the extreme end, where it is necessary to pull to release the thrust plate $b$. In the form shown in Fig. 1, the fulcrum point is at the center, the load on the outside, and the power application at the extreme inner end where it is necessary to push to release the thrust plate.

From the above it will be seen that it is necessary to have only two styles of levers to effect change from push to pull release. Inasmuch as these levers are simple stampings, this does not result in a very great tool cost, or does not involve a large inventory of parts in duplicating all sizes of clutches, or all variations of clutch designs for both pull and push release.

Or with the modification shown in Figs. 6 and 7, a lever $h^2$ is provided which has two fulcrum points $x$ and $v$ and by simply shifting the position of the fulcrum block the lever is changed from first to second order, or vice versa.

What I claim is:

1. A clutch having in combination a driving member, a driven member, a pressure device for packing the driving member and the driven member together, means on the pressure device for receiving a lever for transmitting a releasing effort, and a reversible fulcrum block which is reversible to provide a fulcrum bearing on either side of the lever receiving means, as elected, whereby the releasing effort may be a push or a pull, as elected.

2. A clutch having in combination a driving member, a driven member, a pressure device for packing the driving and driven members together, means on the pressure device for receiving a lever for transmitting a releasing effort, said lever having a fulcrum point on either side of the point where the same is received by the lever receiving means, and a reversible bearing block for providing a fulcrum bearing on either side of the said lever receiving means, as elected, whereby the releasing effort may be a push or a pull, as elected.

3. A unitary clutch structure comprising a plate having a series of openings therein, said openings being surrounded by collars, a member having a friction surface, posts on said member which project through the openings in the plate and engage the sides of the openings to form a driving connection between the member and the plate, actuating arms connected to said posts and adapted to engage the collars on opposite sides of the posts to hold the member and plate in assembled relation relatively to each other, and spring means arranged between said plate and member.

4. The combination with a fly wheel having a friction surface and a surrounding flange, of a unitary structure adapted to be bolted directly to said flange, said structure comprising a cover plate having a series of openings surrounded by collars, a clutch ring having posts which project through said openings and engage said collars to form a driving connection between the clutch ring and the cover plate, (said posts having slots in their ends, and actuating arms which extend through said slots and are adapted to engage the collars on opposite sides of the posts whereby said arms serve to hold the unitary structure assembled and for moving the clutch ring relatively to the plate.

5. A clutch structure adapted to be bolted as an assembled unit directly to the fly wheel of an automobile, said structure comprising a plate having openings surrounded by collars, a clutch ring having posts which project through said openings and engage the collars to form a driving connection between the ring and plate, actuating arms connected to the posts at their outer ends and adapted to engage the collars on opposite sides of the posts whereby said actuating arms serve to hold the structure assembled, and spring means arranged between said plate and clutch ring.

In testimony whereof I have affixed my signature.

ERNEST E. WEMP.